United States Patent [19]

Sommer

[11] 3,800,930
[45] Apr. 2, 1974

[54] VARIABLE SPEED DRIVE

[75] Inventor: Gordon M. Sommer, Grosse Pointe, Mich.

[73] Assignee: G. M. Sommer Co. Inc., Detroit, Mich.

[22] Filed: Sept. 22, 1972

[21] Appl. No.: 291,217

[52] U.S. Cl...... 192/104 F, 192/103 F, 192/85 AA, 192/113 B, 192/18 A
[51] Int. Cl. ... F16d 25/62, F16d 13/72, F16d 13/74
[58] Field of Search........ 192/104 F, 103 F, 85 AA, 192/113 B, 110 B, 18 A

[56] References Cited
UNITED STATES PATENTS

| | | | |
|---|---|---|---|
| 3,437,188 | 4/1969 | Long | 192/104 F X |
| 3,494,450 | 2/1970 | Mankowsky et al. | 192/18 A |
| 3,648,814 | 3/1972 | Barron | 192/113 B |
| 2,785,781 | 3/1957 | Johanson | 192/113 A X |
| 3,530,965 | 9/1970 | Wilson | 192/113 B |
| 3,412,834 | 11/1968 | Root | 192/113 B X |
| 3,145,816 | 8/1964 | DeLorean et al. | 192/113 B X |

*Primary Examiner*—Samuel Scott
*Assistant Examiner*—Lance W. Chandler
*Attorney, Agent, or Firm*—Harness, Dickey & Pierce

[57] ABSTRACT

A variable speed drive, adapted to be mounted between and supported by a motor shaft and a driven shaft, comprising: a rotatable housing defining a fluid reservoir, and drivingly connected to the motor shaft; an output shaft having an end section located in the fluid reservoir, and an opposite end drivingly connected to the driven shaft; a clutch disc stack including a first series of drive discs located in the fluid reservoir and supported for rotation by the housing, and a second series of driven discs interleaved with the drive discs, and supported for rotation with the output shaft; and a piston actuator slidably located at one end of the clutch disc stack, and adapted to compressively engage the clutch disc stack. The loading pressure of the clutch disc stack is selectively modulated by the piston actuator to provide variable rotary motion to the output shaft by a control system which includes an electrically operable servo relief valve for controlling the piston, and a control module which provides a variable output signal to the valve in response to a desired preset rotary output speed characteristic. In another form of the subject invention the drive is modified to selectively accelerate the output shaft to the speed of the drive motor, for use in starting high inertia, constant speed, equipment. This form of the drive includes a larger actuating piston to provide increased torque.

20 Claims, 4 Drawing Figures

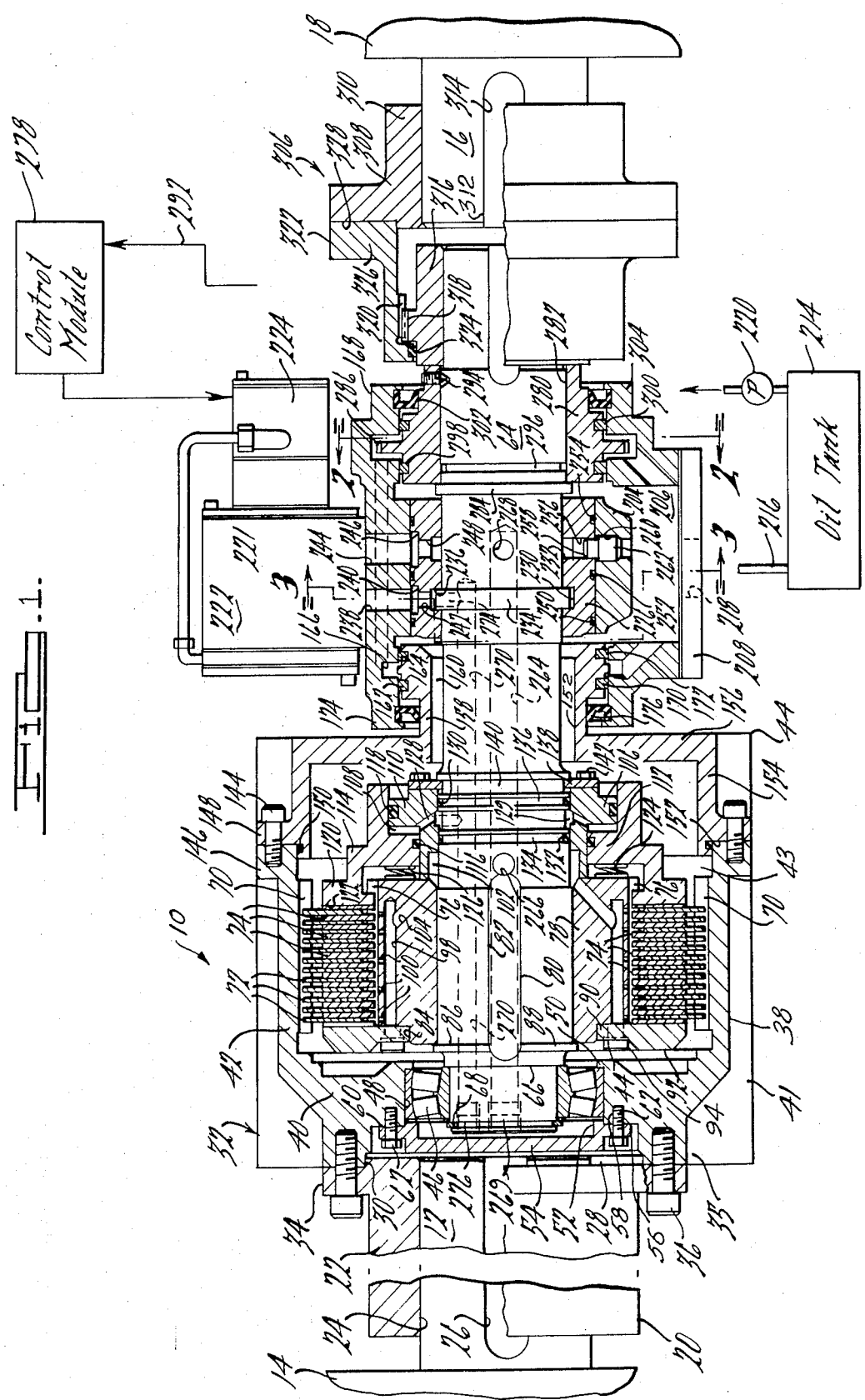

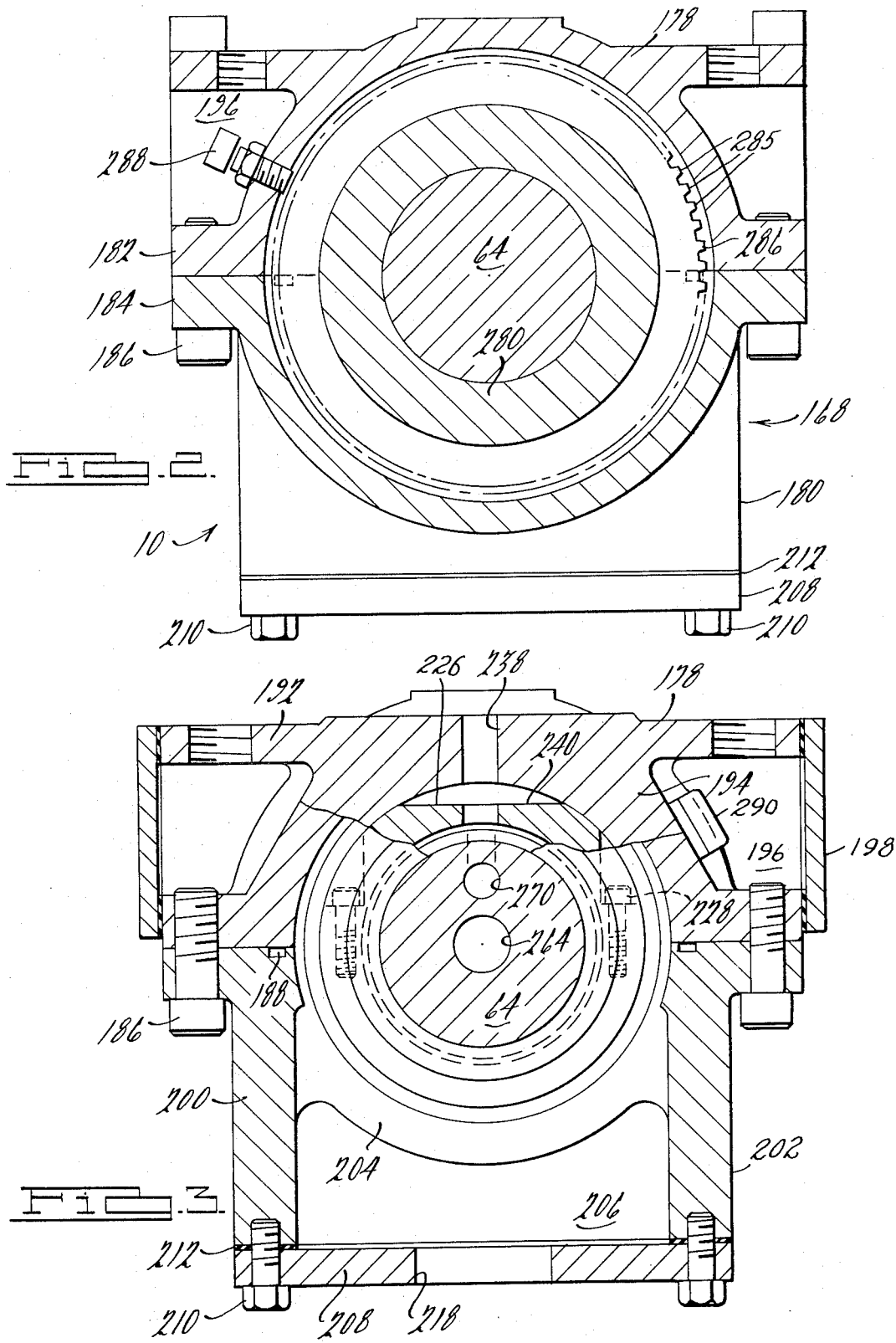

VARIABLE SPEED DRIVE

BACKGROUND AND SUMMARY OF THE INVENTION

This invention relates generally to variable speed transmissions, and more particularly to a transmission which operates on an oil shear principle wherein torque is transmitted from an input to an output shaft through shearing of an oil film disposed on a series of interleaved discs, and wherein the speed characteristics of the output shaft are controlled by varying the pressure loading between the discs.

The subject invention pertains to a new and improved variable speed drive adapted to be mounted between, and supported by, a motor shaft and a driven shaft, with the unit itself being adapted to function as a flexible coupling, whereby the need for precise parallel offset and angular misalignment between the shafts is obviated. In the conventional, or typical, variable speed drive unit, a relatively large, foot mounted, housing is provided for rotatably supporting an input and output shaft; and in the conventional construction as many as six bearing assemblies may be utilized. Some of these bearing assemblies are subjected to high thrust loading, due to the internal design, and the method of torque transmission of the drive. Moreover, space must be provided for mounting the large housing with its extending shaft members, the shafts must be aligned, and flexible couplings must be provided for connecting the input shaft thereof with the drive motor, and an output shaft with the driven machine. It is therefore a primary object of the subject invention to provide a new and improved variable speed drive unit requiring minimal installation space and adapted to function at least in part as a flexible coupling.

In the subject invention main housing is bolted directly to a hub that is adapted to fit onto the motor shaft. This housing thus rotates with, and is supported by, the motor shaft, and supports an outer race of a single, heavy duty, spherical bearing assembly, the bearing assembly being mounted within the main housing proximate the outer end of the motor shaft and rotatably supporting one end of an output shaft. Due to the arrangement, the bearing is not subjected to thrust loading. The opposite end of the output shaft is supported by splines in a single engagement, flexible coupling. A torque transmitting, clutch disc stack is located within the main housing, and includes a first series of drive plates splined directly to the main housing, and a second series of driven discs splined to the output shaft. An actuation piston is located at one end of the stack and slidably supported by the output shaft. It is therefore another object of the subject invention to provide a variable speed drive utilizing a single bearing assembly arranged in such a manner that it is not subjected to thrust loading, whereby the need for a plurality of bearing assemblies is obviated.

In another feature of the subject invention, a stationary housing is disposed proximate one side of the rotatable housing and defines an oil manifold. The manifold functions to direct a hydraulic liquid from a servo relief valve to either the actuation piston or the disc stack. Moreover, the manifold serves to receive the return oil from the rotatable housing, and supports a magnetic pickup in an integrally formed, terminal box, the latter being adapted to receive the electrical leads from the pickup and servo valve. A pulse gear is mounted on the output shaft to provide a feedback signal, in conjunction with the magnetic pickup, to the control module. The oil manifold is supported on the output shaft by a bushing which acts as a shaft seal during the transfer of the hydraulic liquid from the servo valve to fluid passages located in the output shaft. This bushing is adapted to leak hydraulic fluid to a return chamber of the manifold, and the leakage is utilized as an effective and rugged shaft seal that is relatively maintenance free. The return hydraulic fluid is contained in the manifold by a plurality of piston rings that act as highly efficient labyrinth seals. Split mechanical shaft seals are mounted externally to the labyrinth seal piston rings to keep dirt, foreign objects, or residue, out of the assembly, and the oil manifold is split on a horizontal center line so that the outer shaft seals can be readily replaced without disturbing any of the other components. It is therefore a further object of the subject invention to provide a variable speed drive having an effective and rugged shaft sealing arrangement which requires little, or no, maintenance, and contributes to provide long operational life for the unit.

An additional advantage is to be found during installation of the unit. The unit is completely assembled when shipped, with the exception of the two hubs that mount on the motor shaft and the driven shaft. These hubs are mounted with a shrink fit on the motor shaft and the driven shaft, and the two shafts are aligned within certain specified tolerances. The complete assembly is then disposed between the shafts and bolted to the two hubs. This completes the installation, except for various ancilliary piping and electrical connections. Thus, it is another object of the subject invention to provide a variable speed drive which is easily installed at its destination of usage.

The subject invention is adapted to provide variable reduced speed to an output shaft coupled to a driven machine by controllably slipping the clutch disc stack. The drive unit may also be operated with the disc stack in a "lock-up" condition whereby the driven machine is operated at the same speed as the driving motor. This provides a greater efficiency and can result in the use of smaller fans and pumps utilized for cooling the unit. It is therefore another object of the subject invention to provide a variable speed drive unit wherein the disc stack may be operated in both a slipping and lock-up condition. Additional objects include providing a drive unit which is simple and compact in design, economical to produce and operate, and extremely rugged and maintenance free in operation.

Other objects and advantages of the present invention will become apparent from the following detailed description, taken in conjunction with the accompanying drawings:

BRIEF DESCRIPTION OF THE DRAWINGS

FIG. 1 is a cross sectional elevation of a preferred embodiment of the subject variable speed drive unit including various auxiliary components indicated by block diagram;

FIG. 2 is a transverse cross sectional elevation of the drive unit illustrated in FIG. 1 taken on the lines 2—2 thereof;

FIG. 3 is a transverse cross sectional elevation of the drive unit illustrated in FIG. 1 taken on the lines 3—3 thereof.

DETAILED DESCRIPTION OF THE PREFERRED EMBODIMENTS

Figure 4:
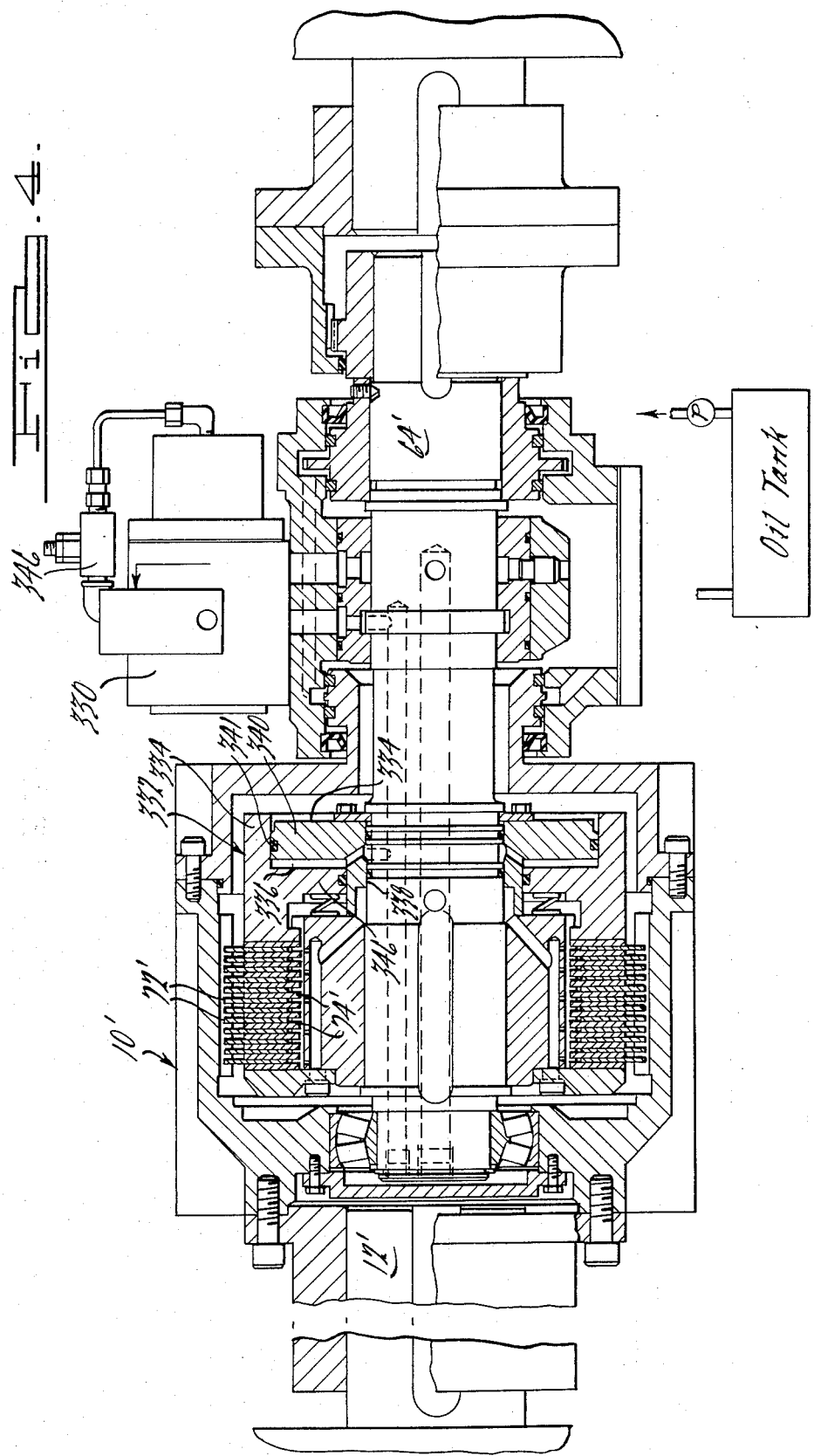
FIG. 4 is a cross sectional elevation of a modified form of the drive unit ilustrated in FIG. 1.

With reference now to FIG. 1 of the drawings and in accordance with a preferred embodiment of the subject invention, a variable speed drive is indicated generally at 10, located between, and supported by, a drive shaft 12 of a constant speed drive means 14 such as an electric motor or the like, and a driven shaft 16 of an associated machine 18. The machine, by way of example, can include such devices as extruders, conveyors, pumps, fans, mixers, or any other driven machine that utilizes variable speed. As shall hereinafter become apparent, the variable speed drive unit 10 of the subject invention is adapted to selectively convert the constant rotary motion of the motor drive shaft 12 to a reduced variable speed range for the driven shaft 16 to suit the individual speed requirements thereof.

The variable speed drive 10 is connected for rotation with the motor shaft 12 by means of a motor adapter or hub 20. The adapter 20 is comprised of an elongated, cylindrically shaped, hub section 22 having an axially extending bore 24 adapted to be shrunk fit on the drive shaft 12, and including a suitable keyway (not shown). The keyway in the hub section 22 is complementary to a keyway 26 located in the drive shaft 12, and is adapted to drivingly connect the motor adapter 20 to the drive shaft 12 via a suitable key member (not shown). The right end of the adapter 20 includes an enlarged, radially extending, flange 34 having an axially extending raised face 28 located in a counterbore 30 formed at the left end of a rotatable housing assembly 32. The flange 34 is connected by a plurality of circumferentially spaced screws, bolts, or the like 36 to a blind flange formed on the left end of the assembly 32 as viewed in FIG. 1.

The rotatable housing assembly 32 is comprised of a main housing member 38 having a radially extending end wall 40 and an axially extending skirt section 42, and a cover housing member 44 to be hereinafter described. A plurality of circumferentially spaced, fins or fan blades 41 are disposed about the outer periphery of the assembly 32, and are adapted to provide a heat transfer function for the unit 10. An outer race of a spherical bearing assembly 46 is supported in a cylindrically shaped opening 48 extending through the end wall 40. The right end of the outer race is disposed against an inwardly extending lip 50 formed at the right end of the opening 48 with the opposite end being secured or retained by an annular shaped lug 52 formed on a cover plate 54. The cover plate 54 includes a radially extending flange portion 56 having a plurality of circumferentially spaced bolt holes which are aligned with a plurality of circumferentially spaced, threaded bores 58 located in the end wall 40. A flat annular shaped gasket 60 is interposed between the outer face of the end wall 40 and the abutting face of the flange portion 56, and sealingly compressed therebetween by the engagement of suitable bolts, screws or the like 62, whereby the outer end of the opening 48 is fluidly sealed and closed.

The bearing assembly 46 rotatably supports the inward end of an elongated output shaft 64 which extends outwardly from an opposite end of the assembly 32. The inner race of the assembly 46 is located on an outer peripheral section of the shaft 64 against a radial shoulder 66 formed at the right end thereof and secured thereagainst by one or more retaining rings 68.

The inner periphery of the skirt section 42 defines a fluid reservoir 48, and is formed with a plurality of circumferentially spaced, longitudinally extending, splines 70 which are adapted to slidably receive a series of internally bored, clutch drive plates 72. The plates 72 are each provided with a plurality of circumferentially spaced, inward radially extending notches adapted for splined engagement with the plurality of splines 70. Similarly, a series of friction discs 74 are interleaved with each of the drive plates 72 and carried on a splined formation 76 formed on an outer peripheral surface of a clutch hub member 78. The hub member 78 is adapted for rotation with the output shaft 64 by a suitable key member 80 engaged in a keyway formed in the outer periphery of the output shaft 64 and the inner periphery of the member 78. The left end of the hub member 78 is disposed against a shoulder 86 formed in an enlarged section 88 of the output shaft 64 and includes an annular shaped recess 84. An inward, radially extending, flange 90 of an axially stationary, thrust plate 92 is disposed in the recess 84 and secured therein by suitable bolts, screws or the like 94. The clutch drive plates 72 and friction discs 74 are restricted from movement relative to the left end of the assembly 32 by a radial bearing face 96 formed on the plate 92. The plate 92 also is adapted to close the left end of a plurality of circumferentially spaced, fluid passages 98.

In the subject invention, a hydraulic fluid media is directed across the radial abutting surfaces of each of the drive plates 72 and friction discs 74 via a plurality of longitudinally spaced, radially extending passages 100 in fluid communication with passages 98. The hydraulic media maintains a positive oil film on each of the disc plates 72 and discs 74 which is subject to be viscously sheared by controllably modulating the loading of the pressure between adjacent plates 72 and discs 74, as shall hereinafter be described, whereby a controlled slippage, and a correspondingly reduced rotary motion to the output shaft 64 is achieved. The hydraulic media is introduced into the passages 98 from an annular recess 102 formed in the left end of a piston seat member 106, and is in fluid communication therewith via a plurality of angularly arranged passages 104, each of the passages 104 fluidly communicating one of the passages 98.

A pressurizable working cylinder 108 is formed between an upward, radially extending, flange section 110 of the member 106 and an inward, radially extending, flange section 112 of a piston actuator 114. The cylinder 108 is sealed on oppositely spaced, axial ends by a first O-ring 116 disposed in the inner periphery of the section 108, and a second O-ring 118 located in the outer periphery of the section 110. The actuator 114 also includes a pressure plate 120 having a disc bearing face 122 adaped to selectively compress the drive plates 72 and the friction discs 74 in response to slidable movement to the left of the actuator 114. The actuator 114 is biased to the right, or to a relatively noncompressing position relative to the plates 72 and discs 74, via a plurality of circumferentially spaced, coil springs 124 located between the right radial face of the member 78 and an adjacent face 126 of the actuator 114. The actuator 114 is, however, slidable to the left against the bias of the springs 124, by introducing a pressurized hydraulic fluid media in the working cylinder 108. The fluid is transferred to the cylinder 108 via one or more passages 128 extending angularly through the member 106, the passages 128 being in fluid communication with an annular recess 129 formed on the output shaft 64. The annular recess 129 is sealed by O-ring members 130 and 132 located in annular shaped grooves 134 and 136, respectively, the grooves 134 and 136 being formed in the output shaft 64 and axially disposed on opposite sides of the recess 129. The piston seat member 106 is retained from an axial movement by a split keeper ring 138 located in an annular groove 140 formed in the outer periphery of the shaft 64 and connected to the member 106 via suitable bolts, screws, or the like 142.

The right end of the fluid reservoir 43, as defined by the main housing 38, is closed by the cover housing 44. The housing 38 and 44 are connected by a plurality of bolts, screws, or the like 144 located in abutting flange portions 146 and 148 of the main and cover housings, 38 and 44 respectively, and fluidly sealed by an O-ring 150 disposed in an annular recess 152 formed at the left end of the flange 148. The cover housing is comprised of an axially extending, annularly shaped, section 154 having an outward end connected to a radially extending, end wall section 156. An axially extending hub section 158 of a reduced diameter relative to the section 154 extends to the right from the end wall 156, and includes a centrally located bore 159. The diameter of the bore 159 is enlarged relative to the diameter of the shaft 64 and defines an axially extending, annular shaped, fluid passage 160 therebetween. The right end of the section 158 is radially enlarged and includes a pair of annular grooves 162 and 164 in the outer periphery thereof. The grooves 162 and 164 are axially spaced on opposite sides of annular recess 166 formed in a stationary oil manifold or housing 168. A pair of piston rings 170 and 172 are located in the annular grooves 162 and 164 respectively and form a labyrinth fluid seal adapted for sealing the right end of the annular fluid passage 160. Moreover, an oil seal member 176 is located in the outer end of the oil manifold 168 and to the left outer end of the labyrinth seal to prevent ingress of dirt and foreign particles and egress of hydraulic fluid.

As best seen in FIGS. 2 and 3, the oil manifold 168 is comprised of upper and lower housing members 178 and 180. Each of the members 178 and 180 include laterally extending flange sections 182 and 184 on opposite sides thereof. The upper face of the flange section 184 has a drain groove 188 and the sections 182 and 184 are connected by suitabe bolts, screws, or the like 186. a laterally extending upper wall section 192 is spaced in parallel relationship relative to the flange 184 and projects outwardly from a cylindrically shaped, inner section 194. The space defined between the wall 192 and flange 184 forms a conduit or terminal housing 196, which is enclosed by a suitable cover plate 198. For convenience, the opposite side of the oil manifold 168 is formed as a mirror image, so that either side may be utilized as the terminal housing for electrically interconnecting the various leads and conductors as required for the installation of the variable speed drive unit 10.

As best seen in FIG. 3, the lower housing member 180 is comprised of a pair of rectangularly shaped, side walls 200 and 202, spaced on opposite lateral sides of a lower cylindrical section 204 and extending downwardly therefrom. A return oil chamber 206 is defined by the side walls 200 and 202, the cylindrical section 204 and a cover plate 208. The plate 208 is removably connected to the lower end of the side walls 200 and 202 by a fluid tight gasket means and a plurality of suitable screws, bolts, or the like indicated generally at 210. Hydraulic fluid in the chamber 206 is communicated by gravity to a fluid receiving tank 214 by a suitable pipe, or conduit 216, the conduit 216 having an end connected to a threaded aperture 218 provided in the cover plate 208 and an opposite end connected to the tank 214. The fluid receiving tank 214 is part of an auxiliary hydraulic system which further preferably includes a filter, a heat exchanger for cooling the hydraulic fluid, and a hydraulic pump, indicated generally at 220. The discharge side of the pump 220 is connected to an inlet port of a hydraulically actuated relief valve 222 operatively mounted on the upper housing member 178. An electrically operable, servo relief valve 224 is mounted on the right end of the valve 222 and pilots the operation of the hydraulically actuated relief valve 222. The details of the relief valve 222 and servo valve 224 form no part of the subject invention, but can be of the type disclosed in the copending application of Gordon M. Sommer entitled "Control System For Variable Speed Drive," Ser. No. 291,218 filed Sept. 22, 1972, (attorneys Docket U.S. Case No. 14) that application being incorporated herein by reference. The operation, however, of the relief valve 222 and servo valve 224 will be further described in conjunction with the operation of the variable speed drive 10.

In the subject invention, the stationary oil manifold 168 is adapted to selectively direct a hydraulic fluid media from the fluid amplifier valve 222 to both the actuation piston 114 and the clutch disc stack, and direct the return oil from the stack to the receiver tank 214 via the chamber 206. The manifold 168 itself is supported on the output shaft 64 by a bushing 226 preferably made from a high grade of bearing bronze. The bushing 226, as best observed in FIG. 3, is divided along its horizontal center line to provide two half sections adapted for assembly on the shaft 64 by suitable screws, bolts, or the like 228. A pair of annular shaped grooves, 230 and 232, are formed in the inner periphery of the bushing 226, the groove 230 being adapted to receive a radially extending flange 234 formed on the outer periphery of the output shaft 64. The diameter of the flange 234 is less than the inner diameter of the groove 230 whereby an annular shaped, fluid passage 236 is defined therebetween. The passage 236 is in fluid communication with a discharge port of the fluid amplifier 222 via a vertically extending passage 240 formed in the upper housing member 178, a flat 240 formed in the outer periphery of the bushing 226 (see FIG. 3), and a radially extending passage 242 therein. Correspondingly, the groove 232 is in fluid communication with a second discharge port of the fluid amplifier 222 via a radially extending passage 244 formed in the upper housing member 178, a flat 246 formed in the outer periphery of the bushing 226, and a radially extending passage 248. Opposite longitudinal sides of the flats 240 and 246 are fluidly sealed by suitable O-ring members 250, 252, and 254 disposed in the outer periphery of the bushing 226. The O-rings 252 and 254 also serve to fluidly seal opposite longitudinal sides of a radially extending passage 256, the passage 256 communicating the annular groove 232 with the outer periphery of the bushing 226. A locating pin 258, having an enlarged head 260, is disposed in the passage 256 with the head 260 being disposed in an enlarged, radially extending, passage 260 formed in the cylindrical section 204 of the lower housing member 180. The pin 258 serves to suitably align the bushing 226 relative to manifold 168 whereby the passages 238 and 244 are centrally located, relative to radial center line of the flats 240 and 246, respectively.

In the subject invention, the output shaft is utilized to convey hydraulic fluid from the valve 222 to the drive plates 72 and friction discs 74 and the piston working cylinder 108. In this regard the output shaft 64 has a centrally located, longitudinally extending, passage 264 extending inwardly from its left end, and fluidly communicable with first and second, transversely extending, passages 266 and 268. The left end of the passage 264 is closed by a suitable threaded plug 269 received therein, and the passages 266 and 268 are suitably, longitudinally spaced, to align with the annular recess 102 formed on the piston seat member 106, and the annular passage 232 of the bushing 226, respectively. In a like manner, the working cylinder 108 and the annular passage 236 are fluidly connected via a longitudinally extending passage 270 radially spaced from the passage 264 and closed by a suitable threaded plug 276 in fluid communication with radially extending passages 272 and 274, respectively. Thus, it will be seen that dual fluid paths are defined on the downstream side of the servo amplifier 222 whereby the piston actuator may selectively engage, or compress, the clutch drive discs 72 and friction plate 74, while simultaneously the hydraulic fluid not required to maintain the proper piston actuator pressure as determined by the servo control, is directed to the plates 74 and discs 72 to thereby maintain viscous shear and to carry away the heat generated by friction.

In the subject invention, an electrical output signal from a control module 278 is used to controllably operate the servo valve 224, the output signal being correctably adjusted by a feedback signal indicative of the actual rotary motion of the output shaft 64. In this regard, a pulse gear 280 having a central opening 282 is located against a shoulder of a radially extending flange 284 formed on the outer periphery of the output shaft 64. The gear 280 includes a large number of circumferentially spaced teeth 285 located on a gear carrying section 286, the latter being located proximate a magnetic pickup assembly 288 (see FIG. 2); operatively mounted in the terminal housing 196. The feedback signal from the magnetic pickup 288 is transmitted to a terminal block 290, also supported in the housing 196 via a suitable conductor and in turn transmitted to the control module via a conductor 292. The gear 280 is adapted for rotation with the output shaft 64 through engagement of a suitable set screw 294 which inwardly engages the outer periphery of the output shaft 64, and the central opening 282 is fluidly sealed by an O-ring 296 located in the outer periphery of the shaft 64.

The right end of the oil manifold 168 is fluidly sealed in a manner identical with the left end thereof, and includes a pair of piston rings 298 and 300 located on opposite sides of the gear carrying section 286 of the pulse gear 280 and a suitable oil seal 302 carried in the right end of a hub section 304 of the oil manifold 168. Thus, it will be seen that the return hydraulic fluid is contained in the oil manifold by the piston rings 170, 172, 298 and 300, and the oil seal rings 302 and 176. It will be noted that the oil manifold 168 is split on the center line so that these dirt seals can readily be replaced without disturbing any other component. Furthermore it will be noted that the bushing 226 is adapted to leak hydraulic fluid between its inner periphery and the outer periphery of the output shaft 64 which is returned to the chamber 206. This permits the bushing 226 to function as a lightly loaded hydrostatic bearing and provides a highly effective, maintenance free, rugged shaft seal.

The driven shaft 16 is adapted for rotation with the output shaft 64 by a rotary coupling assembly 306. By way of example, the assembly 306 may be comprised of a flange member 308 having a hub portion 310 connected to the driven shaft 16 through engagement of a key 312 in a suitably formed keyway 314, and including an annular shaped connecting ring 316 similarly keyed to the output shaft 64. The ring 316 has a spline formation 318 disposed about its outer periphery which is engageable by a complementary spline formation 320 formed on the inner periphery of a second flange member 322. The member 322 is resiliently connected to the ring 316 through an O-ring 324 located in the inner periphery of the member 322, and the opposite end of the member 322 includes a complementary flange section 326 located in an annular recess 328 formed in the abutting end of the member 308. As is conventional in the art, the abutting flange sections of the members 308 and 322 may be connected by suitable circumferentially spaced screws, bolts, or the like (not shown).

As indicated previously, the subject variable speed drive unit 10 is adapted to be easily installed and supported by the drive shaft 12 of the motor 14, and the driven shaft 16 of the machine 18. The entire unit 10 is adapted to be initially preassembled and packaged with the exception of the motor adapter 20 and the flange member 308. The motor adapter 22 and the flange member 308 are initially located and fitted on the drive shaft 12 and driven shaft 16, respectively. Thereafter the previously preassembled variable speed drive unit 10 is dropped into place and connected to the adapter 22 and member 308 respectively. The connecting bolts 36 and rotary coupling bolts (not shown) are threadably engaged and the drive unit 10 is ready for operation except for operatively connecting the control and hydraulic systems. The installation of the hydraulic system includes running the conduit 216 from the discharge port 218 of the fluid chamber 206 to the tank 214, and connecting the discharge side of the pump 220 to the port 221 of the amplifier valve 222. Correspondingly, the servo valve 224, pump 220, magnetic pickup 288, and the control module 278 are suitably electrically interconnected by suitable electrical leads or conductors.

In operation, the control module 278 is suitably preset to provide an output signal in accordance with a desired rotary motion for the driven shaft 16. The details of the control module 26, and the control circuit therefor, form no part of the subject invention, but again, reference may be had to the copending application of Gordon M. Sommer, previously incorporated herein by reference, for a disclosure of a control system which may be used advantageously with the subject variable speed drive unit 10. As indicated therein, the magnitude of the output signal from the module 278 is proportional to the pressure applied to the actuation piston 114 through operation of the servo valve 224. The pump 220 provides a constant source of pressurized hydraulic fluid which is supplied to the working cylinder 108 for actuating the piston 114. The pressure of the hydraulic fluid in the cylinder 108 is increased or decreased by the servo and hydraulically actuated valves 224 and 222, respectively in response to the output signal from control module 278. The remaining volumetric output of hydraulic fluid from the pump 220 is directed by the hydraulically actuated valve 222 to the clutch disc stack as hereinbefore described for cooling and for maintaining the oil shear between the discs. The output signal from the control module 278 is adjusted in accordance with the feedback signal from the pulse gear whereby the rotary motion of the output shaft 64 is precisely controlled. It will also be noted that the subject variable speed drive unit 10 is adapted to "failsafe" in the event of loss of pressurized hydraulic fluid. In such an event the discs 74 and plates 72 are frictionally disengaged by virtue of the bias provided by the plurality of coil springs whereby the drive shaft 12 is drivingly disengaged from the driven shaft 16.

As indicated previously, when the driven equipment is to be operated at a constant speed in accordance with the drive means, but getting the equipment rotationally started is the problem, the subject invention may be modified therefor. Consider, for example, an application involving high static friction wherein high torque is required to initially start the equipment moving as may be encountered in a large conveyor system. For this type of application, the control module 278 can provide a speed signal ramp as a function of time to control the valves 222 and 224. The torque of the variable speed drive 10 will be very high at break-away and then automatically be reduced to smoothly accelerate the driven machine to full motor speed. Other types of equipment as, for example, ball and rod mills, hammer mills, fans, pumps or the like generally do not have high break-away torque requirements relative to the accelerating torque requirement, and smooth acceleration can be achieved by programming accelerating torque as a function of time. For such applications the control system 10 and the valves 20 or 20' and 200 can be replaced by a combination relief and acceleration valve.

In FIG. 4, a modified drive unit is indicated generally at 10' and is identical with the variable speed drive unit 10 with the exception that the control module 26 has been eliminated the servo system has been replaced with a combination relief and acceleration valve 330, and an enlarged piston actuator 332 and piston seat member 334 having replaced the actuator 114 and seat member 106, respectively. It will be appreciated, however, that the drive unit 10' may also be controlled by the module 278 and valves 222 and 224 in accordance with the type of equipment to be driven and as previously explained above. For purposes of clarity, identical elements and components are indicated in FIG. 4 with the same numerals used in FIGS. 1–3, but with the addition of a prime (').

Since the output shaft 64' is to be selectively accelerated to an angular velocity corresponding to the angular velocity of the drive shaft of a constant speed motor, and thereafter to rotate at the same angular velocity as the drive shaft, an enlarged piston area is provided relative to the piston area of the variable speed drive unit 10 to provide an increased compressive force between the plates 72' and discs 74' illustrated in FIG. 1 and also an enlarged working cylinder 336. In this regard, it will be seen that the piston seat member 334 is comprised of a longitudinally extending hub section 338, and an outward, radially extending, flange section 340 carrying an O-ring 341 in its outer periphery for fluidly sealing the right end of the working cylinder 336 against the inner periphery of an axially extending section 344 of the piston actuator 332. Correspondingly, the piston actuator 332 includes an inward radially extending flange section 346 carrying an O-ring in its inner periphery for sealing the left end of the working cylinder 336 against the outer periphery of the hub section 338 of the seat member 334. The remaining details of the unit 10' are identical with the variable speed drive unit 10 and operate in an identical manner. 2

The unit 10' is controlled by a combination relief and acceleration valve 330 which may be of the type wherein the loading pressure for the working cylinder 336 is applied as a function of time through a screw adjustment on the valve 330, i.e., a needle valve 346 may be provided to operate as a variable orifice. As the needle valve 346 is throttled towards a closed position, the time interval required for loading the working cylinder 336 is increased. Correspondingly, as the needle valve 346 is adjustably set towards its open position, the working cylinder 336 will be pressurized at a much greater rate. Thus, by controlling the degree of throttle in the needle valve 346, an acceleration rate will be established for the output shaft 64' and the high inertia machine will be initially accelerated at a selected rate until it attains the angular velocity of the drive shaft 12'. Thereafter the plates 72' and 74' will lockup under the applied force of the piston actuator 332. The details of the combination relief and acceleration valve 330 form no part of the subject invention, but reference again may be had to the previously incorporated copending application of Gordon M. Sommer for details of a combination relief and acceleration valve which may be advantageously used with the unit 10'.

As will be appreciated, the drive unit 10 because of the control module aspect, can provide acceleration-deceleration control, if desired, by suitably programming the electronics. For applications involving deceleration, an auxiliary brake is provided which also can be controlled by the module 26. Accordingly, to accelerate the output shaft 16, the friction in the clutch disc stack is increased by increasing the clamping force. The clamping force is applied by the actuating piston 110 in response to the magnitude of pressure in the working cylinder 108. Since this pressure is increased or decreased by the servo valve 222 in response to the output signal of the control module 278, it will be noted that the rate of change of the output shaft 16 can be controlled in accordance with a suitable speed reference programmed in the control module 278. Correspondingly, in a like manner, deceleration can also be provided by controllably modulating the clamping pressure applied to the brake. Thus, the variable speed drive unit 10 of the subject invention is extremely flexible in operation and is easily adapted to provide variable speed but also preselected acceleration and deceleration control. Moreover, the clutch may be operated in a lockup condition to drive the driven equipment directly from the motor 14 which increases the efficiency of the unit.

While it will be apparent that the preferred embodiments of the variable speed drive unit illustrated herein and the exemplary application, is well calculated to fulfill the objects above stated, it will be appreciated that the present invention is susceptible to modification, variation and change without departing from the proper scope or fair meaning of the subjoined claims.

What is claimed is:

1. A variable speed drive unit located between, and supported by, a drive shaft and a driven shaft comprising:
   a housing supported for rotation with the drive shaft and defining a fluid reservoir;
   an output shaft having a first end drivingly connected to the driven shaft, and an opposite end located in said housing and rotatably supported thereby;
   a series of clutch plates located in said reservoir and supported for rotation with said housing;
   a series of friction discs located in said reservoir and supported for rotation with said output shaft, said discs being adapted for selective frictional engagement with said clutch plates;
   actuating means including piston means located in said housing, for selectively engaging said plates and said discs;
   a source of pressurized liquid media; and
   control means including valve means connected to said source and said piston means for selectively operating said actuating means to provide an applied frictional force between said plates and said discs in accordance with a desired angular speed characteristic of the driven shaft, said valve means including relief means for controlling the magnitude of pressure applied on said piston means by selectively discharging said liquid to said clutch plates and friction discs.

2. The invention, as recited in claim 1, further comprising: a relatively non-rotatable housing axially spaced from said first mentioned housing and in fluid communication therewith, said non-rotatable housing being supported by said output shaft and defining a second fluid reservoir; and combination shaft sealing and bearing means located in said non-rotatable housing including means for transferring said liquid media from said valve means to said output shaft.

3. The invention, as recited in claim 2, wherein said valve means is operatively connected to said non-rotatable housing and wherein said non-rotatable housing defines first and second fluid passage means.

4. The invention, as recited in claim 3, wherein said first and second passage means are in fluid communication with said piston means, and said clutch plates and friction discs respectively.

5. The invention, as recited in claim 1, including spring means associated with said piston means for disengaging said clutch plates and said friction discs.

6. The invention, as recited in claim 1, wherein said control means includes electrical circuit means for providing an output signal in accordance with a desired angular speed characteristic of said output shaft.

7. The invention, as recited in claim 6, including a pulse gear mounted for rotation with said output shaft, a magnetic pickup located proximate said pulse gear and providing a feedback signal to said circuit means in accordance with the angular speed of said output shaft, and wherein said circuit means is responsive to said feedback signal to correctably adjust said output signal in accordance therewith.

8. A variable speed drive unit for drivingly connecting a drive means to a driven means comprising:
   housing means for defining a fluid reservoir, said housing means including a first section connected for rotation with said drive means and a second non-rotatable section axially spaced from said first section and including a bushing located in said non-rotatable section functioning as a hydrostatic bearing;
   an output shaft rotatably supporting said non-rotatable section and connected to said driven means;
   a series of clutch plates located in said housing means and mounted for rotation with said drive means;
   a series of friction discs supported by said output shaft for rotation therewith and interleaved with said clutch plates; and
   means for selectively modulating the fluid pressure between said plates and discs to provide a controlled slippage therebetween.

9. The invention, as recited in claim 8, wherein said last mentioned means includes actuating means for compressing said plates and said discs, a control circuit providing an electrical output signal in accordance with a preset angular speed desired for said driven means, and valve means responsive to said output signal for controlling the compressive force applied by said actuator means.

10. The invention, as recited in claim 9 wherein said valve means is operatively connected to said non-rotatable section and wherein said non-rotatable section defines first and second fluid passage means.

11. The invention, as recited in claim 10, wherein said first and second passage means are in fluid communication with said actuating means, and said clutch plates and friction discs respectively.

12. A variable speed drive comprising:
   a rotatable housing adapted for connection with a drive means and rotatable therewith;
   an output shaft having a first end adaptd for connection with a driven means and an opposite end rotatably supported by said rotatable housing;
   a stationary housing supported by said output shaft;
   hydrostatic bearing means located in said stationary housing for providing a shaft seal for said output shaft;
   a clutch including a first series of drive plates supported in said rotatable housing for rotation with said drive means, and a series of friction discs carried by said output shaft and adapted for selective frictional engagement with said plates;
   actuating means located in said rotatable housing for frictionally engaging said drive plates to said friction discs; and
   valve means connected to a source of pressurized hydraulic fluid for directing said fluid to said bearing means, said drive plates and friction discs, and said actuating means; and control means associated with said valve means and said actuating means for selectively modulating the frictional engagement between said plates and discs.

13. The invention, as recited in claim 12, including bearing means for rotatably supporting one end of said output shaft relative to said housing.

14. The invention, as recited in claim 13, wherein said bearing means comprises a sole spherical roller bearing.

15. The invention, as recited in claim 12, wherein said rotatable housing includes a plurality of fins located about the outer periphery thereof and adapted to provide a heat transfer function whereby to remove heat from said reservoir.

16. The invention, as recited in claim 12, wherein said actuating means includes a piston member having a first side in fluid communication with the source of pressurized fluid.

17. The invention, as recited in claim 16, wherein said actuating means includes spring means acting on an opposite side of said piston member to provide a "fail-safe" in the event of loss of said pressurized fluid.

18. The invention, as recited in claim 12, including speed sensor means carried by said output shaft for determining the angular motion thereof.

19. The invention, as recited in claim 18, wherein said sensor means includes a pulse gear mounted to said output shaft and a magnetic pick-up carried by said stationary housing and disposed proximate to said pulse gear.

20. A variable speed drive unit adapted to be located between, and supported by, a first and second hub located on a drive shaft and a driven shaft, respectively, the unit comprising:
- a housing assembly connected to one of said hubs and adapted for rotation therewith;
- an output shaft having a first end rotatably supported by said assembly and a second end connected to the other of said hubs;
- bearing means interposed between said housing assembly and said first end of said output shaft for rotatably supporting said output shaft, said bearing means being the sole means for supporting said output shaft for rotatable movement relative to said drive shaft;
- a series of clutch plates supported for rotation with said assembly;
- a series of friction discs supported for rotation with said output shaft;
- actuating means for selectively engaging said discs and plates to provide desired angular motion to said driven shaft; and
- means associated with said unit for compensating for parallel offset and angular misalignment between said drive and driven shafts.

* * * * *